(12) United States Patent
An et al.

(10) Patent No.: US 9,521,224 B2
(45) Date of Patent: Dec. 13, 2016

(54) HOLDING DEVICE FOR MOBILE TERMINAL

(71) Applicant: LG ELECTRONICS INC., Seoul (KR)

(72) Inventors: Sungje An, Seoul (KR); Seungman Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/504,602

(22) Filed: Oct. 2, 2014

(65) Prior Publication Data

US 2015/0172432 A1    Jun. 18, 2015

(30) Foreign Application Priority Data

Dec. 12, 2013   (KR) ........................ 10-2013-0154928

(51) Int. Cl.
| | | |
|---|---|---|
| *H04B 1/38* | (2015.01) | |
| *H04M 1/04* | (2006.01) | |
| *B60R 11/02* | (2006.01) | |
| *H04B 1/3883* | (2015.01) | |
| *B60R 11/00* | (2006.01) | |
| *H04W 88/06* | (2009.01) | |

(52) U.S. Cl.
CPC ............... *H04M 1/04* (2013.01); *B60R 11/02* (2013.01); *H04B 1/3883* (2013.01); *B60R 2011/0005* (2013.01); *B60R 2011/0075* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 6,411,502 B1* | 6/2002 | Burrell | ................. | G06F 1/1626 |
| | | | | 200/308 |
| 6,464,185 B1* | 10/2002 | Minelli | ................. | B60R 11/02 |
| | | | | 248/183.1 |
| 6,505,121 B1* | 1/2003 | Russell | ................. | G01C 21/26 |
| | | | | 340/588 |

(Continued)

FOREIGN PATENT DOCUMENTS

| | | |
|---|---|---|
| DE | 102005033479 A1 | 8/2006 |
| DE | 102012008381 A1 | 3/2013 |

(Continued)

OTHER PUBLICATIONS

Korean Office Action dated Jul. 30, 2015 for Korean Application No. 10-2013-0154928, 6 pages.

(Continued)

*Primary Examiner* — Tuan A Tran
(74) *Attorney, Agent, or Firm* — Fish & Richardson P.C.

(57) ABSTRACT

A holding device for a mobile terminal in a vehicle includes: a holder detachably mounted to a front surface of a dashboard, and configured to insertedly retain the mobile terminal therein; a data transceiver configured to receive vehicle information from the vehicle, and to transmit the vehicle information to the mobile terminal, and power connection terminals positioned in the holder for providing power to the mobile terminal, wherein the power connection terminals automatically put the mobile terminal into a vehicle mode when the mobile device and the vehicle are electrically connected to each other.

21 Claims, 10 Drawing Sheets

(56) References Cited

U.S. PATENT DOCUMENTS

| | | | | |
|---|---|---|---|---|
| 6,529,381 | B1* | 3/2003 | Schoenfish | H05K 5/0204 |
| | | | | 211/71.01 |
| 6,681,176 | B2* | 1/2004 | Funk | G01C 21/3688 |
| | | | | 340/995.2 |
| 7,548,491 | B2* | 6/2009 | Macfarlane | B60R 25/257 |
| | | | | 340/426.35 |
| 7,623,958 | B1* | 11/2009 | Laverick | B60R 11/0258 |
| | | | | 361/679.01 |
| 8,892,172 | B2* | 11/2014 | Grivas | B60R 25/104 |
| | | | | 455/418 |
| 2004/0204840 | A1* | 10/2004 | Hashima | G01C 21/265 |
| | | | | 701/526 |
| 2010/0144404 | A1 | 6/2010 | Cavani | |
| 2013/0144463 | A1* | 6/2013 | Ricci | G06F 9/54 |
| | | | | 701/1 |

FOREIGN PATENT DOCUMENTS

| | | | |
|---|---|---|---|
| GB | 2486569 | A | 6/2012 |
| JP | 2002-370587 | A | 12/2002 |
| KR | 20-0261161 | A | 1/2002 |
| KR | 10-2010-0109061 | A | 10/2010 |

OTHER PUBLICATIONS

European Search Report dated May 6, 2015 for European Application No. 14194490.0, 6 Pages.

* cited by examiner

HOLDING DEVICE FOR MOBILE TERMINAL

CROSS-REFERENCE TO RELATED APPLICATION

Pursuant to 35 U.S.C. §119(a), this application claims the benefit of earlier filing date and right of priority to Korean Application No. 10-2013-0154928, filed on Dec. 12, 2013, the contents of which is hereby incorporated by reference in its entirety.

BACKGROUND OF THE DISCLOSURE

Field of the Disclosure

This specification relates to a holding device for a mobile terminal, and more particularly, to a holding device for a mobile terminal in which the holding device is configured to detachably hold a mobile terminal in a mounted state to a vehicle.

Background of the Disclosure

Generally, a holding device for a mobile terminal is configured to allow a user to view a personal portable terminal, such as a portable phone, Personal Digital Assistants (PDA), Digital Multimedia Broadcasting (DMB) and a navigation, while the vehicle holder is attached to a front window or a dashboard of a vehicle using a suction cup provided at a lower end of the holding device. Typically, the personal portable terminal is detachably coupled to a holder at an upper end of the holding device using a clamping mechanism. The holder is rotatably affixed to the upper end of the holding device such that the position of the personal portable terminal in the holder can adjusted into an appropriate viewing angle.

Such personal portable terminals have become popular due to their portability and diverse functions. Smart phones receive data through cellular networks to provide navigation functions as well as Digital Multimedia Broadcasting (DMB) capabilities. Like smartphones, tablet personal computers (PCs) and other types of personal computer are also capable of receiving similar types of data through telematic services. Nowadays, the number of drivers who subscribe to a telematics service for providing various multimedia services to a driver is continuously increasing. For such telematics service, a telematics terminal should be optionally mounted into a vehicle before the vehicle is released, or a user should additionally purchase such a telematics terminal.

The functions of the telematics terminal (hereinafter referred to as a 'vehicle terminal') can include: a navigation function for guiding a path to a destination, a security alarm function, an emergency relief function (SOS), a remote diagnosis function, a consumer goods management function, a hands-free mobile communication function, a personal information function, a secretary service function, an Internet access function and various other functions may be added as demanded by user. The hands-free mobile communication function can be implemented by a phone mounted within the telematics terminal (internal phone). On the other hand, a hands-free mobile communication function can also be implemented using a driver's mobile terminal (external phone) by connecting the driver's mobile terminal to the telematics terminal through an audio jack. However, only the hands-free function is provided through the telematics terminal while other mobile communication services as well as other functions of the driver's portable terminal are not provided through the telematics terminal. This may cause a driver not to use various functions of their portable terminal or cause a driver to use the functions of the their portable terminal device while distracted from driving.

SUMMARY OF THE DISCLOSURE

Accordingly, embodiments of the invention is directed to a holding device for a mobile communication terminal that substantially obviates one or more of the problems due to limitations and disadvantages of the related art.

An object of embodiments of the invention is to provide a holding device for a mobile terminal, capable of converting a mobile terminal mode into a vehicle mode by easily mounting a mobile terminal thereto in a detachable manner.

Another object of embodiments of the invention is to provide a holding device for a mobile terminal, capable of displaying, controlling and processing information on a vehicle from the mobile terminal and even using the mobile terminal.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of this specification, as embodied and broadly described herein, there is provided a holding device for a mobile terminal, including: a holder detachably mounted to a front surface of a dashboard, and configured to insertedly retain the mobile terminal therein; a data transceiver configured to receive vehicle information from the vehicle, and to transmit the vehicle information to the mobile terminal, and power connection terminals positioned in the holder for providing power to the mobile terminal, wherein the power connection terminals automatically put the mobile terminal into a vehicle mode when the mobile device and the vehicle are electrically connected to each other.

In another aspect, a holding device for a mobile terminal includes: a holder detachably mounted to a front surface of a dashboard, and configured to insertedly retain the mobile terminal therein; a data transceiver configured to receive vehicle information from the vehicle and to transmit the vehicle information to the mobile terminal, power connection terminals positioned in the holder for providing power to the mobile terminal, and a mounting indicator positioned in the holder to automatically put the mobile device into a vehicle mode when the mobile device is mounted in the holder.

The scope of applicability of embodiments of the invention will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of embodiments of the invention and are incorporated in and constitute a part of this specification, illustrate embodiments of the invention

DETAILED DESCRIPTION OF THE DISCLOSURE

Figure 1:
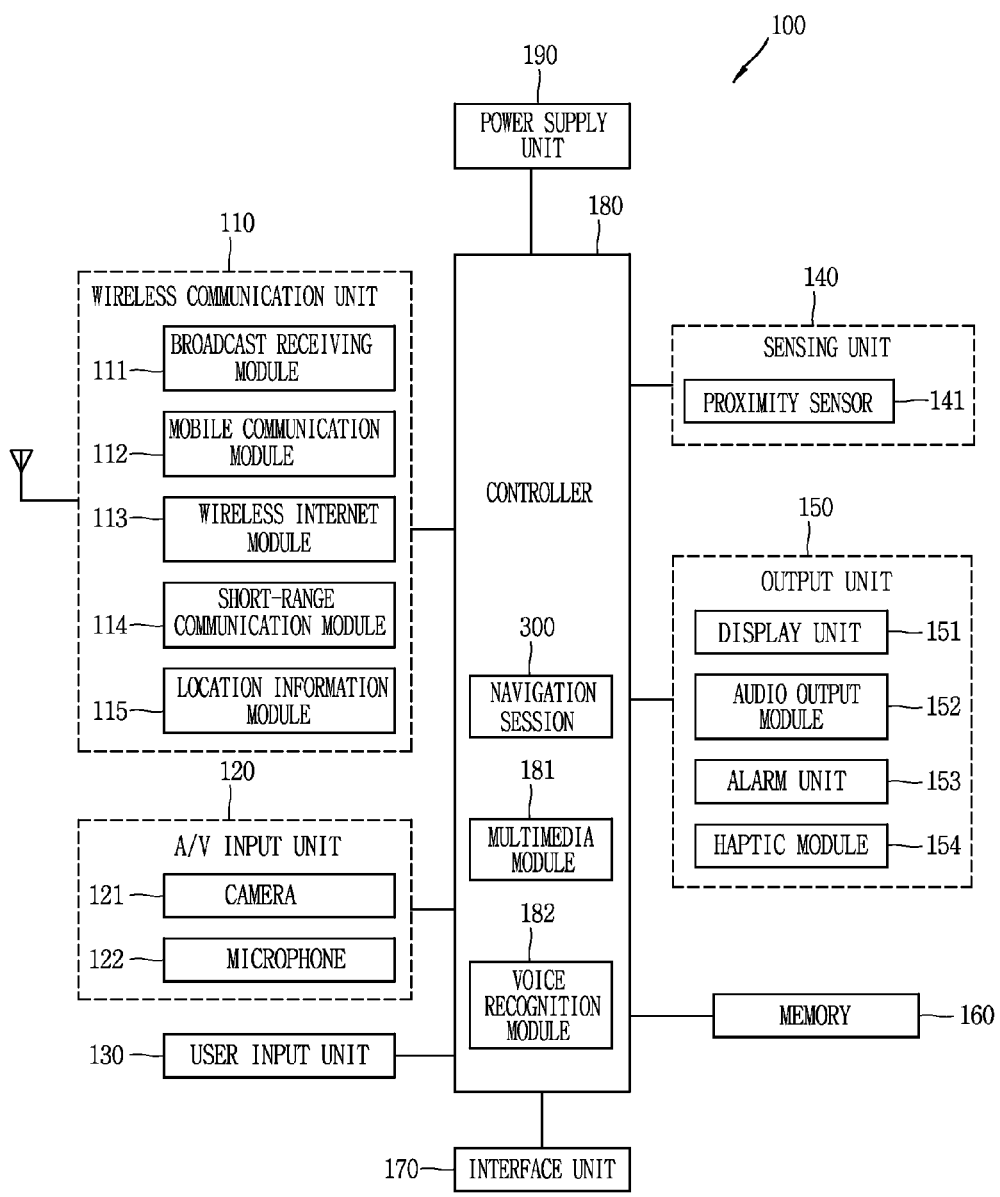
FIG. 1 is a block diagram illustrating a configuration of a mobile terminal for explaining embodiments of the invention.

It should be noted that technological terms used herein are merely used to describe a specific embodiment, but not to limit embodiments of the invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms and are unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps. Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the invention will be described in detail with reference to the accompanying drawings, and the same or similar elements are designated with the same numeral references regardless of the numerals in the drawings and their redundant description will be omitted.

In describing embodiments of the invention, moreover, the detailed description will be omitted when a specific description for publicly known technologies to which the invention pertains is judged to obscure the gist of the invention. Further, the invention may, however, be embodied in many different forms and should not be construed as being limited to the embodiments set forth herein; rather, these embodiments are provided so that this disclosure will be thorough and complete, and will fully convey the concept of the invention to those skilled in the art. Also, it should be noted that the accompanying drawings are merely illustrated to easily explain the spirit of the invention, and therefore, they should not be construed to limit the spirit of the invention by the accompanying drawings.

FIG. 1 is a block diagram illustrating a configuration of a mobile terminal 100 for explaining embodiments of the invention. The mobile terminal 100 according to embodiments of the invention may include a portable phone, a smart phone, a notebook computer, a digital broadcasting terminal, Personal Digital Assistants (PDA) and a Portable Multimedia Player (PMP), etc. As shown in FIG. 1, the mobile terminal 100 may comprise components, such as a wireless communication unit 110, an Audio/Video (A/V) input unit 120, a user input unit 130, a sensing unit 140, an output module 150, a memory 160, an interface unit 170, a controller 180, a power supply unit 190, and the like. Although FIG. 1 shows the mobile terminal 100 having various components, it should be understood that implementing all of the illustrated components is not a requirement but rather an exemplary embodiment of the capabilities of the mobile terminal 100. Greater or fewer components may alternatively be implemented in the mobile terminal 100.

The wireless communication unit 110 may include one or more components that permit wireless communications between the mobile terminal 100 and a wireless communication system. In addition or in the alternative, the wireless communication unit 110 may include one or more components that permits wireless communications between the mobile terminal 100 and a network within which the mobile terminal 100 is located. For example, the wireless communication unit 110 may include a broadcast receiving module 111, a mobile communication module 112, a wireless internet module 113, a short-range communication module 114, a position information module 115 and the like.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), and integrated services digital broadcast-terrestrial (ISDB-T), etc. The broadcast receiving module 111 may be configured to be suitable for every broadcast system that provides a broadcast signal as well as the above-mentioned digital broadcast systems. Broadcasting signals and/or broadcasting associated information received through the broadcast receiving module 111 may be stored in the memory 160.

The mobile communication module 112 transmits/receives mobile network signals to/from at least one of network entities (e.g., a base station, an external terminal, a server, etc.) on a mobile communication network. The mobile network signals may include audio call signals and/or video call signals. Further, such mobile network signals can include various formats of data according to transmission/reception of text/multimedia messages.

The wireless internet module 113 supports wireless Internet access for the mobile terminal 100. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The location information module 115 is a module for checking or acquiring a location (or position) of the mobile communication terminal 100. For example, the location information module 115 may include a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile terminal 100 according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module may acquire speed information by real time calculating a current position. The position information module 115 denotes a module for sensing or calculating a position of the mobile terminal 100. An example of the position information module 115 may include a Global Position System (GPS) module.

Referring back to FIG. 1, the A/V input unit 120 is configured to receive an audio or video signal. The A/V input unit 120 may include a camera 121, a microphone 122 or the like. The camera 121 processes image frames such as still images or moving images acquired by an image sensor in a video call mode or an image capturing mode. The processed image frames may be displayed on a display unit 151. The image frames processed by the camera 121 may be stored in the memory 160 or transmitted to the outside via the wireless communication unit 110. Two or more cameras 121 may be provided according to the configuration of the mobile terminal 100.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated while receiving and transmitting audio signals.

The user input unit 130 may generate input data for allowing a user to control various operations of the mobile terminal 100. The user input unit 130 may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 detects a current status (or state) of the mobile terminal 100, such as an open state or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip that stores various information for authenticating user's authority for using the mobile terminal 100 and may include a user identity module (UIM), a subscriber identity module (SIM), a universal subscriber identity module (USIM), and the like. In addition, the device having the identification module (referred to as the 'identifying device', hereinafter) may take the form of a smart card. Accordingly, the identifying device may be connected with the terminal 100 via a port or other connection mechanisms. The interface unit 170 may be used to receive inputs (e.g., data, information, power, etc.) from an external device and transfer the received inputs to one or more elements within the mobile terminal 100 or may be used to transfer data between the mobile terminal and an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154 and the like. The display unit 151 may display information processed in the mobile terminal 100. For example, when the mobile terminal 100 is in a phone call mode, the display unit 151 may display a User Interface (UI) or a Graphic User Interface (GUI) associated with a call. When the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of these displays may be configured to be transparent so that outside may be seen therethrough, which may be referred to as a transparent display. A representative example of this transparent display may include a transparent organic light emitting diode (TOLED), etc. The mobile terminal 100 may include two or more display units 151. For example, the mobile terminal may include both an external display unit (not shown) and an internal display unit (not shown).

The display unit 151 may be used as an input device rather than an output device. The touch sensor may be implemented as a touch film, a touch sheet, a touch pad, and the like. The touch sensor may be configured to convert changes of a pressure applied to a specific part of the display unit 151, or capacitance occurring from a specific part of the display unit 151, into electric input signals. Also, the touch sensor may be configured to sense not only a touched position and a touched area, but also a touch pressure. When touch inputs are sensed by the touch sensors, corresponding signals are transmitted to a touch controller (not shown). The touch controller processes the received signals, and then transmits corresponding data to the controller 180. Accordingly, the controller 180 may sense which a region of the display unit 151 has been touched.

Referring back to FIG. 1, a proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as capacitance type, proximity of a pointer to the touch screen is sensed by changes of an electromagnetic field. In this case, the touch screen (touch sensor) may be categorized into a proximity sensor.

A pointer that is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer. The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events can include call reception, message reception, key signal inputs, a touch input, etc. In addition to audio or video outputs, the alarm unit 153 may provide outputs in a different manner to inform about the occurrence of an event. The video signal or the audio signal may be output via the display unit 151 or the audio output module 152. Accordingly, the display unit 151 or the audio output module 152 may be classified as part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner. The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100. The haptic module 154 may be provided at a position to which a user frequently contacts. For instance, the haptic module 154 may be provided at a steering wheel, a shift gear lever, a seat, etc.

The memory 160 may store a program for the processing and control of the controller 180. Alternatively, the memory 160 may temporarily store input/output data (e.g., phonebook data, messages, still images, video and the like). The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may serve as a path for power to be supplied from an external cradle to the mobile terminal 100 when the mobile terminal 100 is connected to the external cradle. In addition, the interface unit 170 can provide a path for transferring various command signals inputted from the cradle by a user to the mobile terminal 100. Such various command signals or power inputted from the cradle may operate as signals for recognizing that the mobile terminal 100 has been appropriately mounted onto the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input on the touch screen as text or image. For example, a voice recognition module 182 of the mobile terminal 100 in the controller 180 is configured to recognize a user's voice, and to perform a corresponding function according to the recognized voice. In another module, a navigation session 300 in the controller 180 can be used to display a driving path on map data. In some cases, such embodiments are implemented by the controller 180. The power supply unit 190 serves to supply power to each component of the mobile terminal 100 by receiving external power or internal power under control of the controller 180.

Various embodiments described herein may be implemented in a computer-readable medium using, for example, software, hardware, or some combination thereof. For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, other electronic units designed to perform the functions described herein, or a selective combination thereof.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
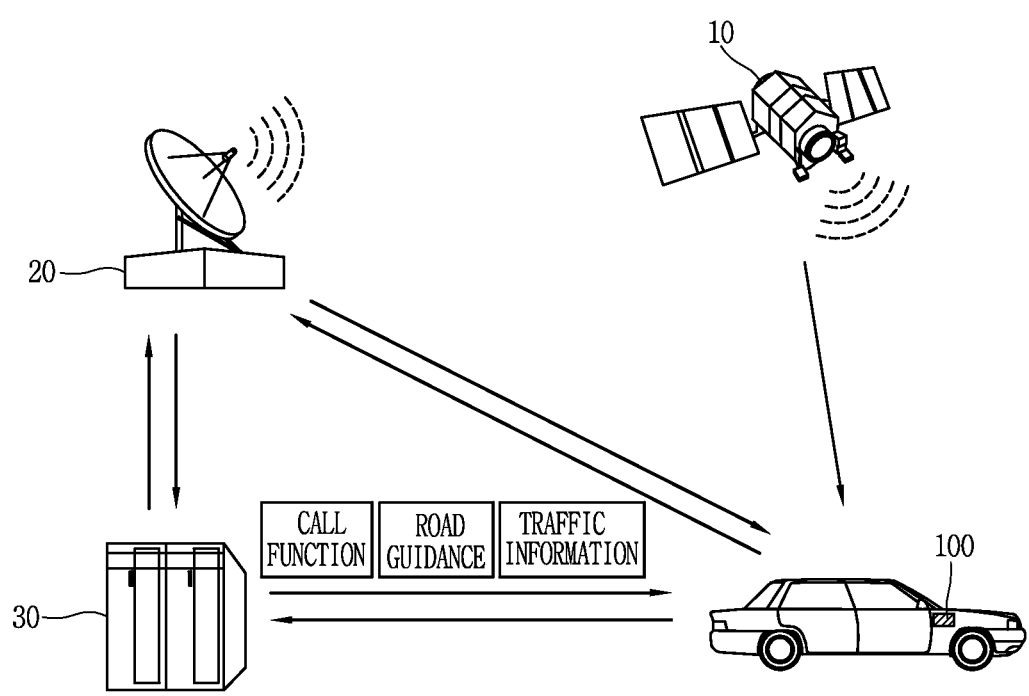
FIG. 2 is a block diagram illustrating a vehicle navigation system for explaining embodiments of the invention.

FIG. 2 is a block diagram illustrating a vehicle navigation system for explaining embodiments of the invention. As shown in FIG. 2, the vehicle navigation system includes an information providing center 30 configured to provide traffic information and various types of data (e.g., programs, execution files, etc.); and a telematics terminal 100 mounted in a vehicle, configured to receive traffic information through a remote wireless communication network 20 and/or a short-range wireless communication network, and configured to provide a road guidance service based on a GPS signal received through an artificial satellite 10, and based on the traffic information. The communication network may further include a wired/wireless communication network such as a Local Area Network (LAN) and a Wide Area Network (WAN).

Various types of traffic information (e.g., information on a road traffic, information on an area of interest, etc.) is collected through the communication network. The collected information is processed by the information providing center 30 (e.g., server) by a Transport Protocol Expert Group (TPEG) standard, and is transmitted to a broadcasting station. Then the broadcasting station transmits traffic information including signal light information, to a vehicle, in an inserted manner into a broadcasting signal.

The information providing center 30 reconstructs various types of information received through various paths connected to a communication network, e.g., information received through an operator's input, wired/wireless Internet, a digital broadcasting service, such as a Transparent Data Channel (TDC) and a Multimedia Object Transport (MOT), other server or a probe car, into a traffic information format based on a Transport Protocol Expert Group (TPEG) standard for a traffic information service. Then the information providing center 30 transmits the information to a broadcasting station. The information providing center 30 may generate a traffic information format of a TPEG standard, the traffic information format including signal lamp information. Then the information providing center 30 may transmit the generated traffic information format to a broadcasting station.

The broadcasting station receives traffic information including signal light information from a server, and then wirelessly transmits the received traffic information to a traffic information receiving terminal mounted in a vehicle (e.g., navigation system), by including the traffic information in a broadcasting signal. The traffic information includes signal light information, and may include information on various types of traffic conditions, such as information required to drive a vehicle on the road, in the sea, or in the sky (e.g., accident, road situation, traffic jam, road construction, road closing, public traffic network delay, airplane delay, etc.).

The broadcasting station receives the traffic information including signal light information processed by a server, and transmits the traffic information to a vehicle through digital signals based on various digital broadcasting standards. In this case, the digital broadcasting standards include an Eureka-147 [ETSI EN 300 401]-based European digital audio broadcasting (DAB) standard, a terrestrial wave or satellite digital multimedia broadcasting (DMB) standard, a terrestrial wave digital video broadcasting (DVB-T) standard, a digital video broadcasting-handheld (DVB-H) standard, a media forward Link Only (MFLO) standard. The broadcasting station may transmit the traffic information includes signal light information, through a wired or wireless network, such as wired or wireless Internet. The vehicle means all types of carriers implemented using machines and electronic devices for the purpose of carrying people or objects, e.g., automobiles, buses, trains, ships, airplanes, etc.

The vehicle is provided with the mobile terminal 100 (traffic information receiving terminal). The vehicle receives signal light information from a broadcasting station, using the mobile terminal 100 (e.g. traffic information receiving terminal). Then, the vehicle processes the received signal light information, and transmits the processed signal light information to a user through a graphic, a text and/or an audio.

Figure 3:
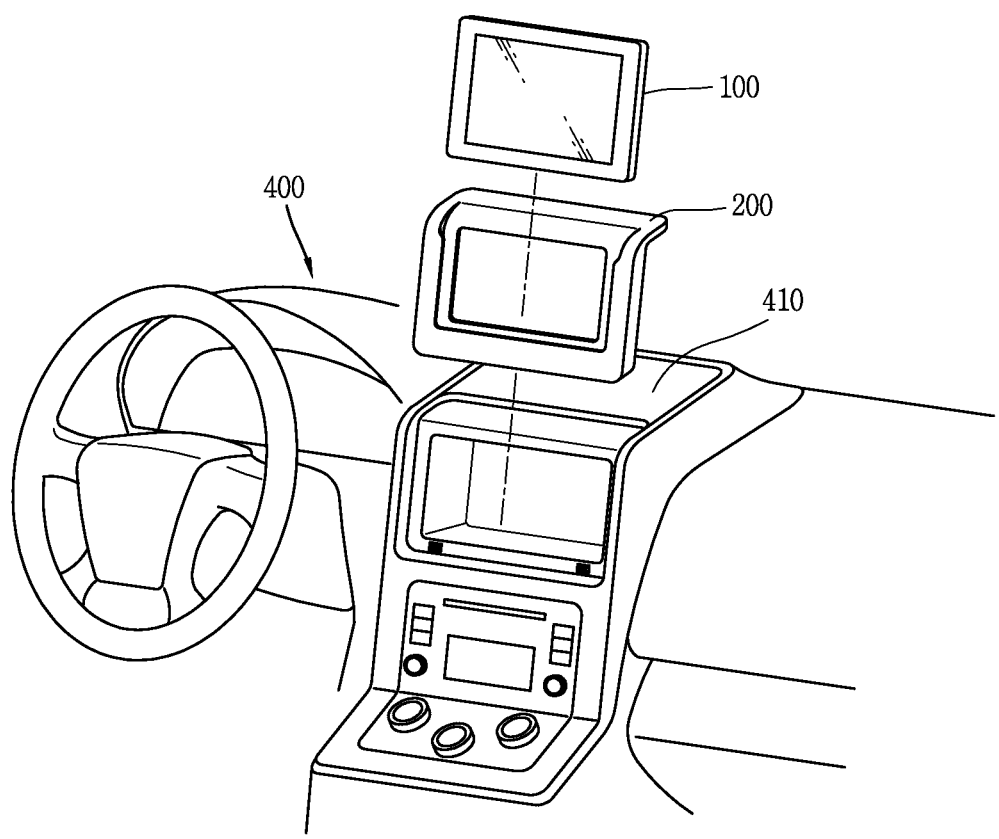
FIG. 3 is a perspective view illustrating a state where a mobile terminal and a holding device have been separated from a vehicle according to an embodiment of the invention.
Figure 4:
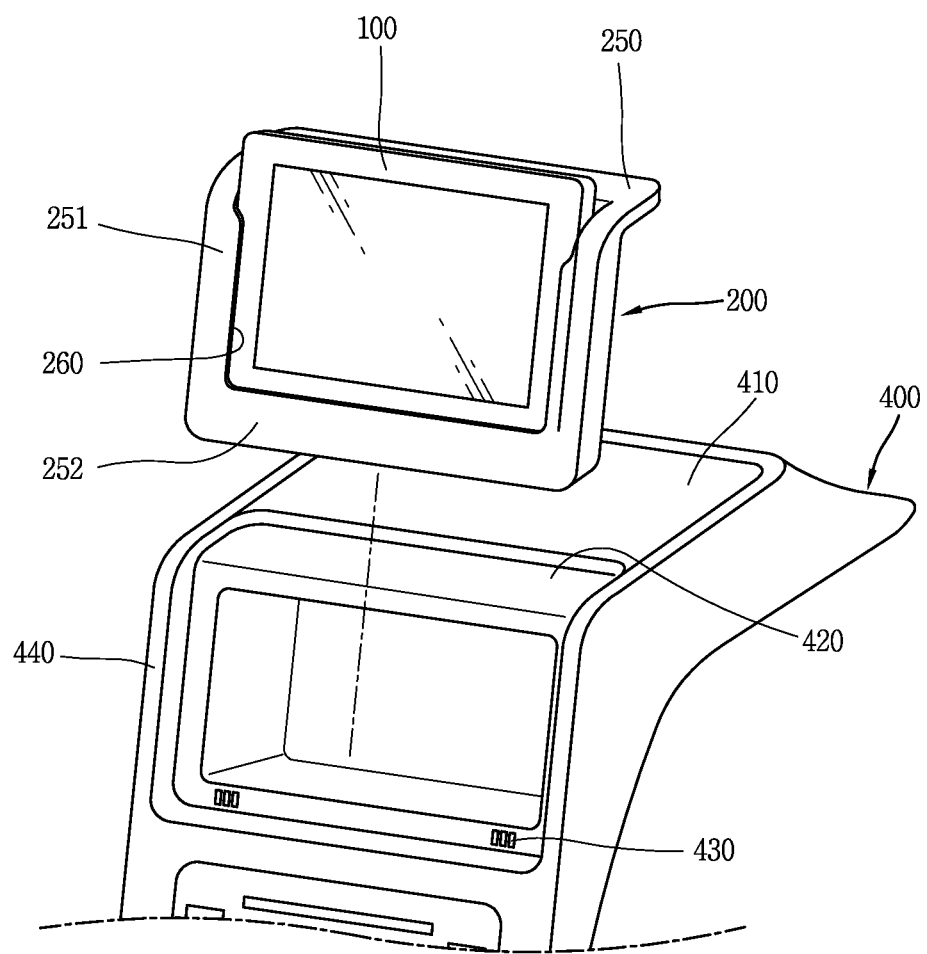
FIG. 4 is a perspective view illustrating a state where a mobile terminal has been mounted to a holding device according to an embodiment of the invention.
Figure 5:
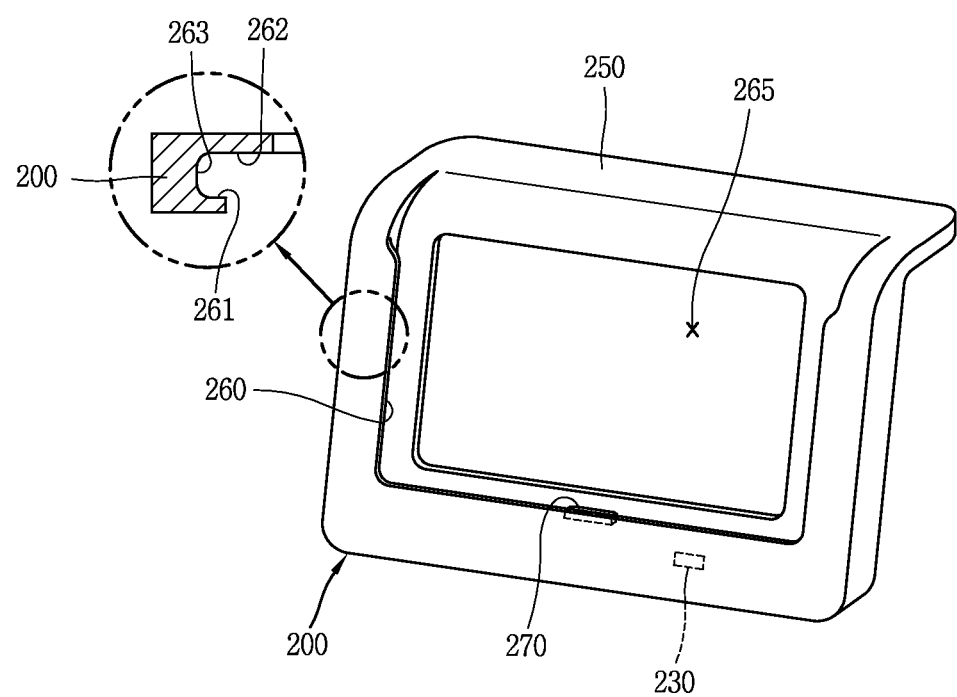
FIG. 5 is a front perspective view of a holding device according to an embodiment of the invention.

FIG. 3 is a perspective view illustrating a state where the mobile terminal 100 and a holder 200 have been separated from a vehicle 400 according to an embodiment of the invention. FIG. 4 is a perspective view illustrating a state where the mobile terminal 100 has been mounted to a holder 200 according to an embodiment of the invention. FIG. 5 is a front perspective view of a holder 200 according to an embodiment of the invention.

The telematics terminal means a vehicle system where a Global Positioning System (GPS) and a mobile communication technology have been combined so as to provide a positioning system and a remote diagnosis function. Telematics is a compound word of "Telecommunication" and "Informatics" (Information Science), which indicates a combined form of a computer and a wireless communication technology. Using such a telematics terminal, a driver can remotely diagnose a vehicle through a wireless network, and obtain various types of information such as traffic situations, news reception, stock investment, e-commerce, financial transactions, hotel reservation, facsimile transcription and games, through a PC mounted in the telematics terminal with a wireless modem. The driver may transmit an e-mail or a short message service using the telematics terminal to an office, and may download a digital video or an audio file through the Internet.

The telematics terminal can track down the vehicle if the vehicle is stolen or lost by using the Global Positioning System (GPS) together with the mobile communication technology. In case of an emergency relief situation, such as a traffic accident, a driver may pinpoint a position of the vehicle using GPS, and transmit a request for help to a nearest police station or rescue center using mobile communication technology. Such a request can facilitate rescue and/or relief.

Referring back to FIGS. 3 to 5, a holding device for a vehicle 400, includes a holder 200 detachably mounted to a surface 440 of a dashboard 410, a mobile terminal 100 configured to be insertedly retained in the holder 200; and a data transmitter and receiver (hereinafter, will be referred to as "a data transceiver") 230 configured to receive vehicle information from the vehicle 400 and to transmit the vehicle information to the mobile terminal 100. The data transceiver 230 may be a terminal capable of transceiving (transmitting and receiving) data, which may be separately formed from the holder 200 or may be mounted in the holder 200. That is, the data transceiver 230 may be provided in one of the mobile terminal 100, the holder 200 and the vehicle 400. The mobile terminal 100 according to an embodiment of the invention means a mobile terminal, a telematics terminal, a tablet PC, a navigation, a notebook computer, a digital broadcasting terminal, a Personal Digital Assistant (PDA), a Portable Multimedia Player (PMP), etc. The mobile terminal 100 may include any multimedia terminal capable of displaying information on a display.

The holder 200 includes a holding portion 250 at the top having a horizontal orientation so as to cover an upper edge of the dashboard 410; intermediate portions 251 at the sides of the holder 200 and connected to two ends of the holding portion 250, guides 260 on the intermediate portions 251 to enable the mobile terminal 100 to slide in one direction to thus be insertedly retained in the holder 200; and a base portion 252 configured to be connected with the intermediate portions 251 to restrict the sliding motion of the mobile terminal 100 at the bottom of the holder 200. According to an embodiment of the invention, the holding portion 250, the intermediate portions 251 and the base portion 252 form a quadrangular-shaped holder 200.

As shown in FIGS. 4 and 5, an opening 265 is in a central portion of the holder 200. The hollow portion 265 serves as a space where a connection line between the holder 200 and the vehicle 400, etc. can be arranged. In the alternative, the opening 265 may not be provided with connection lines. In a side view, the holder 200 has approximately upside down "L"-shaped side surfaces, and the extension of holding portion 250 is shorter than the length of the intermediate portions 251. The holder 200 is detachably mounted to the front surface 440 of the dashboard 410.

As shown in FIG. 5, the guides 260 has a 'C'-shaped cross-section, and includes a first part 261, a second part 262 and a third part 263. The first part 261 is exposed to outside, and contacts part of a front surface of the mobile terminal 100. The second part 262 contacts part of a rear surface of the mobile terminal 100. The third part 263 is formed to be curved, and is configured to connect the first part 261 and the second part 262 to each other.

As shown in FIGS. 4 and 5, the base portion 252 may be configured to be connected with the guide 260, and may have the same cross-sectional shape as the guide 260. That is, the first part 261, the second part 262 and the third part 263 may be formed to extend across the base portion 252. Thus, in an embodiment of the invention, components of the base portion 252 will be provided with the same reference numeral as those of the guides 260. Each of the guides 260 and the base portion 252 are provided with the first part 261, the second part 262 and the third part 263, to engage the mobile terminal 100 in a 'C'-shape so as to restrict a motion of the mobile terminal 100.

The first part 261 should be formed not to block a display region of the mobile terminal 100, and may have a width of 20~50 mm, for example. The width of the first part 261 may be variable according to a size of a bezel portion of the mobile terminal 100.

In an embodiment of the invention, once the mobile terminal 100 is positioned in the guides 260, the mobile terminal 100 can be moved downward within the guides in sliding operation to mount the mobile terminal 100 within the guides 260. In a case where the interface unit 170 is provided at a contact part between the base portion 252 and the mobile terminal 100 (referring back to FIG. 5), the mobile terminal 100 is connected to a connection port 270 at the end of the sliding operation without an additional device. Thus, the mobile terminal 100 can be put into a vehicle mode based on connection information, without an additional wired terminal connection or setting. That is, the mobile terminal 100 can be configured to change into a vehicle mode, upon automatic sensing of a connected state between the mobile terminal 100 and the vehicle 400 when the mobile terminal 100 has been physically connected to the connection port 270. To this end, software (e.g., an application) capable of recognizing that the vehicle 400 has electrically connected to the mobile terminal 100 should be installed in the mobile terminal 100.

The guide 260 may be formed to extend from the intermediate portions 251 across the base portion 252. As aforementioned, like the guide 260 of the intermediate portions 251, a guide in the base portion 252 may include a first part 261, a second part 262 and a third part 263. The first part 261 is exposed to outside, and contacts part of a front surface of the mobile terminal 100. The second part 262 contacts part of a rear surface of the mobile terminal 100. The third part 263 is configured to connect the first part 261 and the second part 262 to each other. However, embodiments of the invention are not limited to this configuration only. For example, the base portion 252 may not be provided with the first part 261 exposed to outside. The second part 262 may not be formed to be curved, but rather may be formed to be flat.

Figure 6:
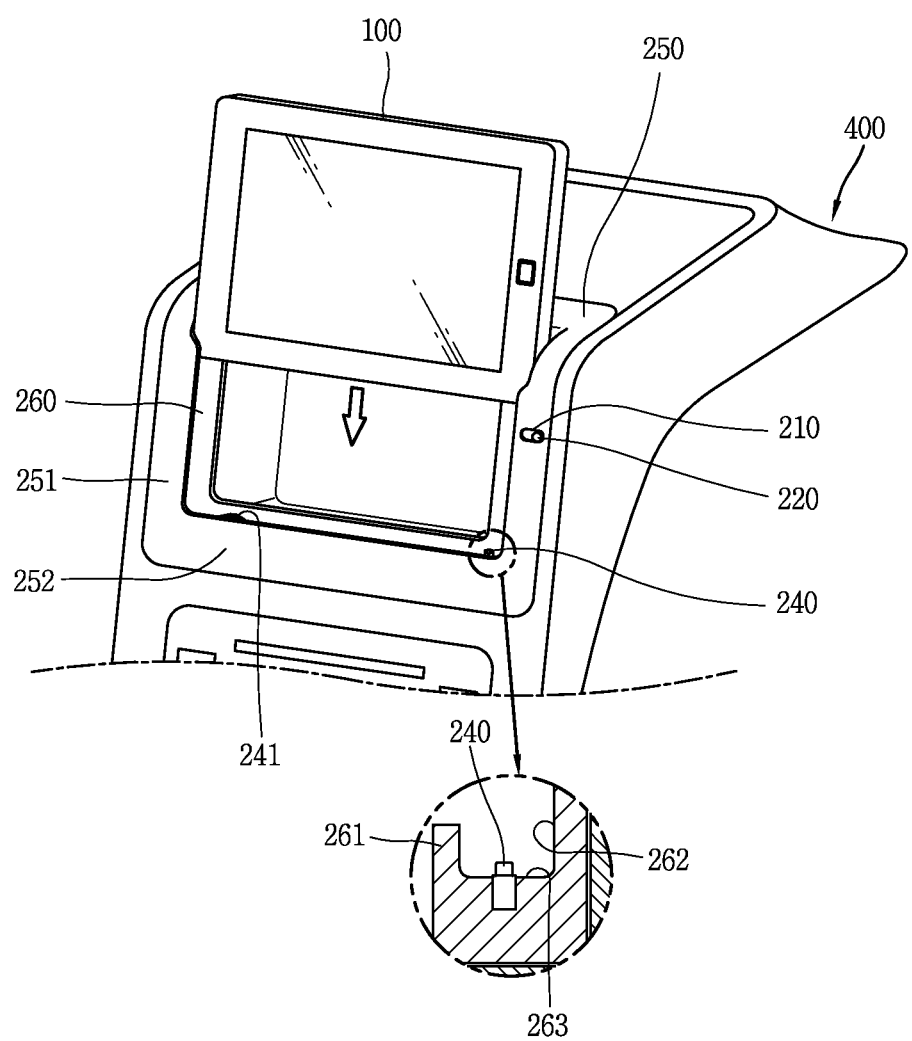
FIG. 6 is a perspective view illustrating a state where a mobile terminal is being inserted into a holding device according to an embodiment of the invention.
Figure 7:
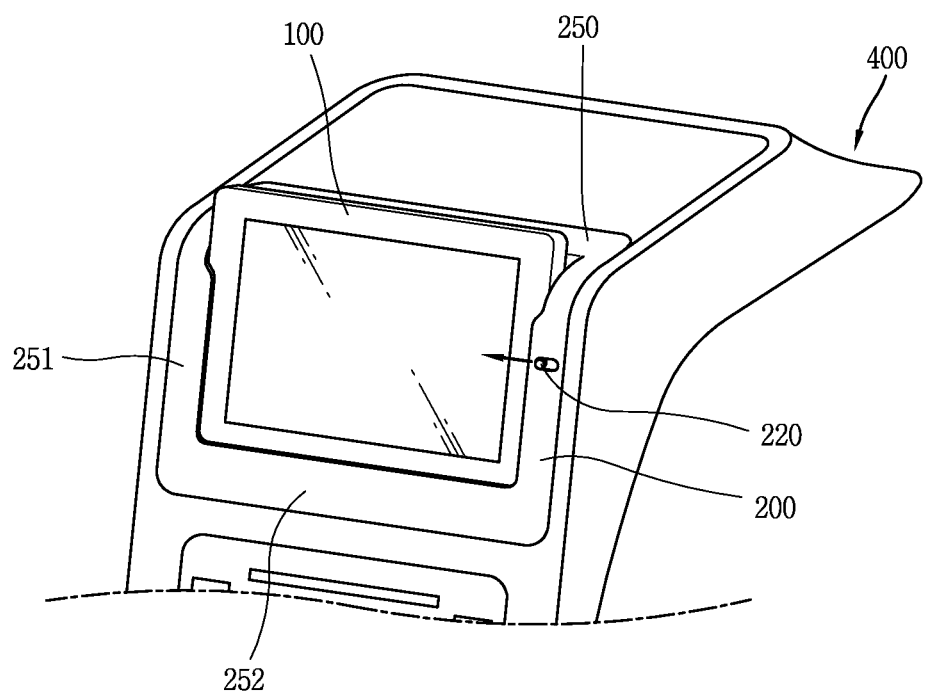
FIG. 7 is a perspective view illustrating a state where a mobile terminal has been inserted into a holding device according to an embodiment of the invention.

FIG. 6 is a perspective view illustrating a state where the mobile terminal 100 is being inserted into the holding device according to an embodiment of the invention. FIG. 7 is a perspective view illustrating a state where the mobile terminal has been inserted into the holding device according to an embodiment of the invention. A mounting indicator, configured to indicate a mounted state of the mobile terminal 100, may be provided at the third part 263 of the base portion 252. The mounting indicator may make the mobile terminal 100 go into a vehicle mode. For example, a buffering member, such as a buffering spring 240 or a locking member 241, may be used as the mounting indicator. The buffering spring 240 or the locking member 241 is formed at the third part 263 of the base portion 252, and is pressed when the mobile terminal 100 is inserted to be mounted to the holder 200. Once the buffering spring 240 or the locking member 241 is pressed, it is recognized that the mobile terminal 100 has been mounted to the holder 200.

The locking member 241 may have a 'Λ'-shape having elasticity. That is, the mobile terminal 100, which has contacted the locking member 241, is downward moved by its weight. Upon completion of the downward motion, a mounted state of the mobile terminal 100 is recognized by the locking member 241. In the above configuration, the buffering spring 240 and the locking member 241 are provided as the mounting indicator. However, embodiments of the invention are not limited to this configuration only. That is, the mounting indicator may include any member having elasticity and formed to be compressible. The mounting indicator may also function as a buffering member if it has an elastic force.

More specifically, the mounting indicators 240 and 241, buffering members, are mounted to one side of the base portion 252. Once the mobile terminal 100 which has been mounted in a sliding manner presses the mounting indicators 240 and 241, the connection port 270 automatically protrudes as result of the mounting indicators 240 and 241 be actuated. As a result, the connection port 270 is connected to the mobile terminal 100. If a connected state between a button 220 and the mobile terminal 100 is released by moving the button 220, the buffering member automatically operates to make the mobile terminal 100 outwardly protrude. As a result, the mobile terminal 100 is separated from the holder 200.

A method of detachably mounting the holder 200 to the vehicle 400 is not limited to the specific disclosed example. For example, a magnet may be mounted in the holder 200 so that the holder 200 can be detachably mounted to the dashboard 410 of the vehicle 400. As another example, the holder 200 can be detachably mounted to the dashboard 410 of the vehicle 400 by a screw-coupling.

In an embodiments of the invention, the connection port 270 is provided to electrically-connect the mobile terminal 100 and the vehicle 400 to each other. Referring back to FIG. 5, the connection port 270 is formed at part of the base portion 252. More specifically, the connection port 270 is formed at the third part 263 of the base portion 252, such that the mobile terminal 100 is automatically electrically-connected to the connection port 270 when mounted. Such case may be applied to the mobile terminal 100 which slides in a vertical direction and which has the interface unit 170 at a lower end thereof. In this case, it is advantageous that an external terminal line is not required.

Figure 8A:
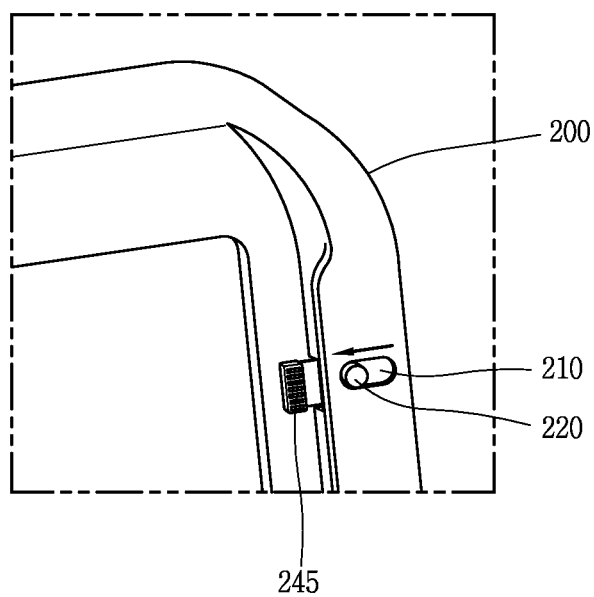
FIGS. 8A and 8B are enlarged views of parts of a holding device according to an embodiment of the invention.
Figure 8B:
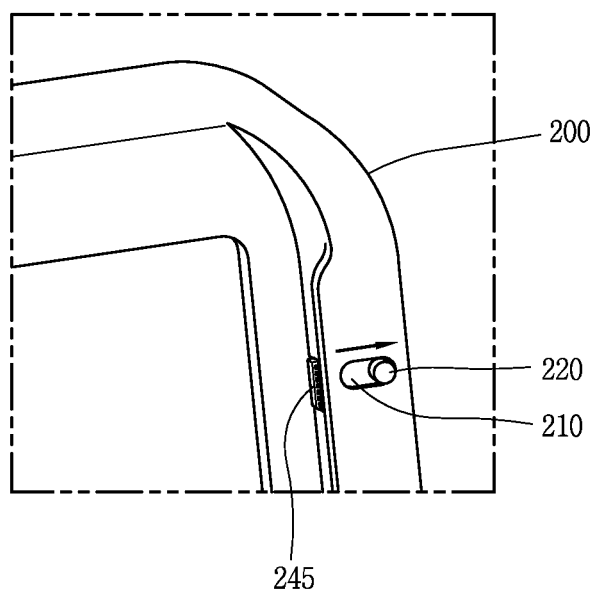

On the other hand, in case of the mobile terminal 100 which slides in a vertical direction and which has the interface unit 170 on a side surface thereof, a connection port 245 is formed at the intermediate portion 251 of the holder 200, as shown in FIGS. 8A and 8B. The connection ports 245 and 270 are provided at least one in number, which can be augmented to enhance a user's convenience by changing the type of pin configuration.

FIGS. 8A and 8B are enlarged views illustrating part of the holder 200 according to an embodiment of the invention. As shown in FIGS. 8A and 8B, the button 220, configured to selectively expose the connection port 245 to outside, is formed at the first part 261. The button 220 is exposed to outside through a button guiding recess 210. The connection port 245 is provided at the third part 263. The button guiding recess 210 is formed in a horizontal direction so that the button 220 can move right and left.

In case of mounting the mobile terminal 100 by a sliding operation in a state where a buffering spring 240 has been provided in the base portion 252 of the holder 200, the mobile terminal 100 is mounted to the holder 200 while pressing the buffering spring 240. The pressing of the buffering spring 240 provides an indication of whether the mobile terminal 100 has been precisely mounted to the holder 200. Then, the connection port 245, hidden in the intermediate portion 251, automatically protrudes toward the inside of the holder 200 to connect to the mobile terminal 100. Thus, the mobile terminal 100 is retained so as not to move and is electrically connected to the vehicle. FIG. 7 illustrates an inserted state of the mobile terminal 100 into the holder 200.

In an embodiment of the invention, the connection port 245 may be connected to the mobile terminal 100 either manually or automatically. In the case of manually connecting the connection port 245 to the mobile terminal 100, a user inserts the mobile terminal 100 into the holder 200, and then moves the button 220 toward the mobile terminal 100. In the case of automatically connecting the connection port 245 to the mobile terminal 100, upon sensing of an inserted state (mounted state) of the mobile terminal 100 into the holder 200 due to the use of mounting indicators 240 and 241, the connection port 245 is automatically connected to the mobile terminal 100 as the button 220 is moved toward the mobile terminal 100. The latter exemplary case (automatic connection) includes inserting the mobile terminal 100 to the holder 200 in a vertical direction. Alternatively, automatic insertion can also be done by inserting the mobile terminal 100 into the holder 200 in a horizontal direction when the holder 200 is designed for horizontal insertion.

In the case of releasing a connected state between the mobile terminal 100 and the connection port 245, a user moves the button 220 so that the connection port 245 can be separated from the mobile terminal 100. As a result, a vehicle mode of the mobile terminal 100 terminates, and the buffering spring 240 operates such that the user can easily separate the mobile terminal 100 from the holder 200 in a lifting manner. Such processes are applicable upon release of the locking member 241.

In an embodiments of the invention, the holding portion 250 can be formed to have the same plane as an upper surface of the dashboard 410 of the vehicle 400. To achieve this effect, a groove 420 is formed at the upper surface of the dashboard 410 of the vehicle 400. Further, the size of the holder 200 may be varied in accordance with the size of the mobile terminal 100. That is, if the mobile terminal 100 is small, the holder 200 is configured to receive a smaller mobile terminal 100. On the other hand, if the mobile terminal 100 is large, the holder 200 is configured to receive a larger mobile terminal 100. The holding portion 250, the intermediate portion 251 and the base portion 252 may form an opening 265 when configured for a larger terminal 100. Alternatively, the holding portion 250, the intermediate portion 251 and the base portion 252 may not have an opening when configured for a smaller terminal 100.

Figure 9:
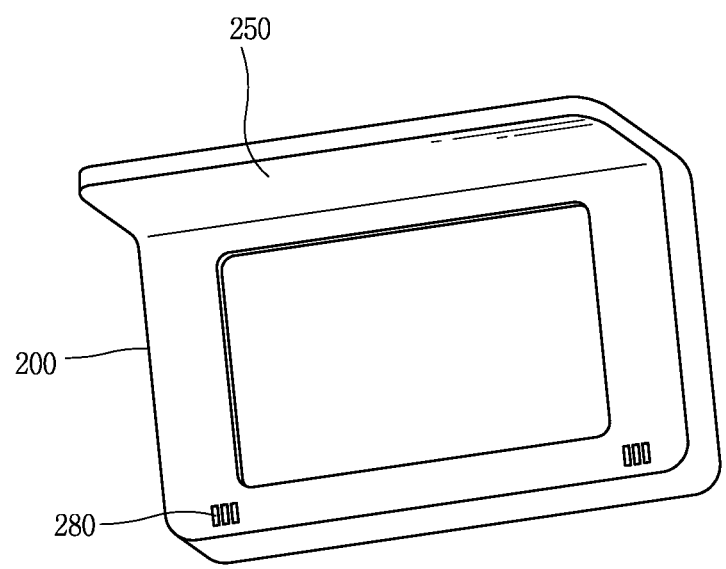
FIG. 9 is a rear perspective view of a holding device according to an embodiment of the invention.

FIG. 9 is a rear perspective view of the holder 200 according to an embodiment of the invention. As shown in FIG. 9, power connection terminals 280, configured to electrically-connect the vehicle 400 and the holder 200 to each other, is formed on a rear surface of the holder 200. The mobile terminal 100 may be supplied with power as the power connection terminals 280 are connected to power connection terminals 430 of the vehicle 400. The power connection terminals 280, provided on a rear surface of the holder 200, are configured to automatically put the mobile terminal 100 into a vehicle mode when the holder 200 and the vehicle 400 are electrically connected to each other.

In an embodiment of the invention, the mobile terminal 100 is easily mounted and connected to the vehicle 400 such the mobile terminal can interface with systems of the vehicle 400. Further, the mobile terminal is automatically converts to or goes into a vehicle mode to thus provide service capabilities relevant to a user interface (UI) suitable for driving. Further, the holder 200 comes in various shapes for compatibility in correspondence to a size and type of mobile terminal 100. More specifically, the holder 200 is designed in consideration of the size, shape and output/input configuration of the mobile terminal 100 together with the position of the power connection terminals 430 of the vehicle 400. That is, a size of the holder 200 corresponds to a size of the mobile terminal 100, and a position of the power connection terminals 280 of the holder 200 corresponds to a position of the power connection terminals 430 of the vehicle 400. A user can use various mobile terminals of different sizes by having holders corresponding to those mobile terminals. The connection ports 245 and 270 may be configured to correspond to the ports of the mobile terminal 100 or have the capability to be adaptable to a variety of ports or pin structures. One holder can fit a variety of mobile devices of same or similar size.

In the disclosed embodiments of the invention, the mobile terminal may be mounted to the holder 200 by sliding in a vertical direction. Alternatively, the mobile terminal may be mounted to the holder 200 by sliding in a horizontal direction.

Figure 10:
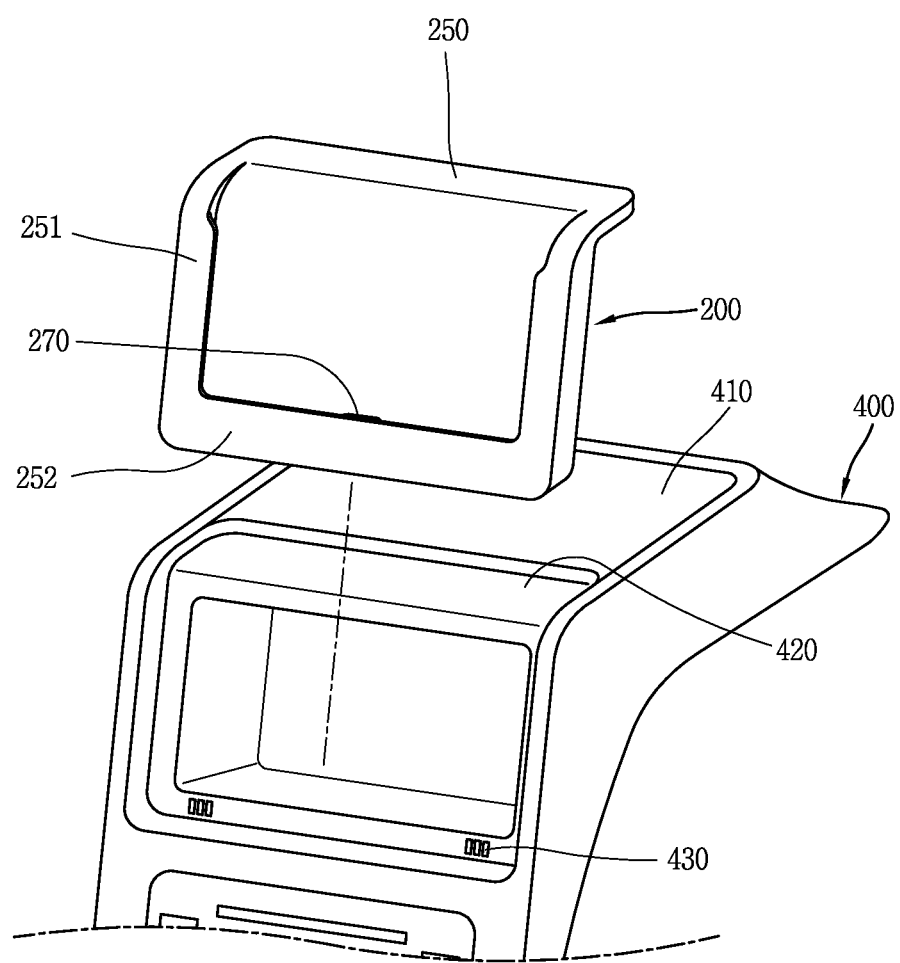
FIG. 10 is a perspective view illustrating a state where a holder has been separated from a vehicle according to an embodiment of the invention.

FIG. 10 is a perspective view illustrating a state where the holder 200 has been separated from the vehicle 400 according to an embodiment of the invention. As shown in FIG. 10, the holder 200 is detachably mounted to the dashboard 410 of the vehicle 400, and is configured to be usable when the mobile terminal 100 is not in use or in use. For example, a cooling device for radiation, or an air passage for radiation may be provided at a space formed by a rear surface of the holder 200 and the dashboard 410. An air passage for air, which has been cooled by passing through an air cooler, or a cooling module may be provided. The cooling module is configured to cool heat generated from inside of the vehicle 400, which may be a component of the vehicle 400. For instance, the cooling module may include a radiator for cooling a fuel cell, a high-voltage component, etc., an air conditioner condenser, and a cooling fan connected to the radiator. Alternatively, a wireless charging unit, configured to wirelessly charge the mobile terminal 100, may be provided by a space formed by a rear surface of the holder 200 and the dashboard 410. That is, a wireless charging unit (wireless charging coil) may be mounted at an inner space between the vehicle 400 and the holder 200, thereby wirelessly charging the mobile terminal 100.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A holding device for a mobile terminal in a vehicle, comprising:
   a holder detachably mounted to a front surface of a dashboard, and configured to insertedly retain the mobile terminal therein;
   a data transceiver configured to receive vehicle information from the vehicle, and to transmit the vehicle information to the mobile terminal; and
   power connection terminals positioned in the holder and configured to provide power to the mobile terminal,
   wherein the power connection terminals are further configured to automatically set the mobile terminal into a vehicle mode when the mobile terminal and the vehicle are electrically connected via the holder,
   wherein the holder comprises:
      intermediate portions mounted to the front surface of the dashboard, the intermediate portions including guides that are configured to guide a sliding motion of the mobile terminal in a first direction into the holder to be insertedly retained in the holder; and
      a base portion extending in a second direction crossing the first direction between the intermediate portions and configured to restrict the sliding motion of the mobile terminal, and
   wherein the intermediate portions and the base portion are formed to have a 'C'-shape enclosing the mobile terminal for retaining the mobile terminal.

2. The holding device for a mobile terminal of claim 1, wherein each of the guides comprises:
   a first part covering part of an upper surface of the mobile terminal;
   a second part contacting at least part of a rear surface of the mobile terminal; and
   a third part that is curved and configured to connect the first part and the second part to each other.

3. The holding device for a mobile terminal of claim 2, wherein the base portion has a same cross-sectional shape as the guides.

4. The holding device for a mobile terminal of claim 2, wherein a connection port is provided at the guide or the base portion, and
   wherein the mobile terminal is automatically electronically-connected to the connection port based on the mobile terminal being mounted in the holder by a sliding operation.

5. The holding device for a mobile terminal of claim 4, wherein a button guiding recess is provided at the first part and accommodates a movable button that controls a protrusion of the connection port to selectively connect the connection port to the mobile terminal.

6. The holding device for a mobile terminal of claim 2, wherein a sensing means configured to sense an inserted state of the mobile terminal is mounted at the third part of the base portion.

7. The holding device for a mobile terminal of claim 6, wherein the sensing means comprises a buffering member having elasticity, and wherein, based on the mobile terminal being mounted in the holder by a sliding operation that compresses the buffering member, the connection port automatically protrudes to electrically connect with the mobile terminal.

8. The holding device for a mobile terminal of claim 1, wherein a size of the holder corresponds to a size of the mobile terminal, and a position of the power connection terminals of the holder corresponds to a position of power connection terminals of the vehicle.

9. The holding device for a mobile terminal of claim 1, wherein a cooling device for radiation, or an air passage for radiation is provided at a space formed by a rear surface of the holder and the dashboard.

10. The holding device for a mobile terminal of claim 1, wherein a wireless charging unit configured to wirelessly charge the mobile terminal is provided at a space formed by a rear surf ace of the holder and the dashboard.

11. The holding device for a mobile terminal of claim 1, wherein the power connection terminals are formed at the base portion or at one of the intermediate portions.

12. A holding device for a mobile terminal, comprising:
a holder detachably mounted to a front surface of a dashboard, and configured to insertedly retain the mobile terminal therein; and
a data transceiver configured to receive vehicle information from the vehicle and to transmit the vehicle information to the mobile terminal;
power connection terminals positioned in the holder and configured to provide power to the mobile terminal, and
a mounting indicator positioned in the holder and configured to automatically set the mobile device into a vehicle mode when that the mobile terminal and the vehicle are electrically connected via the holder,
wherein the holder comprises:
intermediate portions mounted to the front surface of the dashboard, the intermediate portions including guides that are configured to guide a sliding motion of the mobile terminal in a first direction into the holder to be insertedly retained in the holder; and
a base portion extending in a second direction crossing the first direction between the intermediate portions and configured to restrict the sliding motion of the mobile terminal, and
wherein the intermediate portions and the base portion are formed to have a 'C'-shape enclosing the mobile terminal for retaining the mobile terminal.

13. The holding device for a mobile terminal of claim 12, wherein each of the guides comprises:
a first part covering part of an upper surface of the mobile terminal;
a second part contacting at least part of a rear surface of the mobile terminal; and
a third part that is curved and configured to connect the first part and the second part to each other.

14. The holding device for a mobile terminal of claim 13, wherein the power connection terminals are formed at one of the intermediate portions.

15. The holding device for a mobile terminal of claim 13, wherein:
a connection port is provided at the guide or the third part of the base portion, and
a button guiding recess is provided at the first part and accommodates a movable button that controls a protrusion of the connection port to selectively connect the connection port to the mobile terminal.

16. The holding device for a mobile terminal of claim 13, wherein a sensing means configured to sense an inserted state of the mobile terminal is provided at a third part of the base portion.

17. The holding device for a mobile terminal of claim 16, wherein the sensing means comprises a buffering member having elasticity, and wherein, based on the mobile terminal being mounted in the holder by a sliding operation that compresses the buffering member, the connection port automatically protrudes to electrically connect with the mobile terminal.

18. The holding device for a mobile terminal of claim 16, wherein in a case where a connected state between the button and the mobile terminal has been released by a movement of the button, the sensing means automatically operates to make the mobile terminal outward protrude for separation of the mobile terminal from the holder.

19. The holding device for a mobile terminal of claim 12, wherein a size of the holder corresponds to a size of the mobile terminal, and a position of the power connection terminals of the holder corresponds to a position of power connection terminals of the vehicle.

20. The holding device for a mobile terminal of claim 12, wherein a cooling device for radiation, or an air passage for radiation is provided at a space formed by a rear surface of the holder and the dashboard.

21. The holding device for a mobile terminal of claim 12, wherein a wireless charging unit configured to wirelessly charge the mobile terminal is provided at a space formed by a rear surf ace of the holder and the dashboard.

* * * * *